United States Patent [19]
Farmer et al.

[11] Patent Number: 5,519,401
[45] Date of Patent: May 21, 1996

[54] PROGRAMMED RADAR COORDINATE SCAN CONVERSION

[75] Inventors: Michael E. Farmer, Eagan; Stephen M. Sohn, Shoreview, both of Minn.

[73] Assignee: Loral Corporation, New York, N.Y.

[21] Appl. No.: 143,597

[22] Filed: Nov. 1, 1993

[51] Int. Cl.$^6$ .................................................. G01S 7/44
[52] U.S. Cl. .................................... 342/185; 364/731
[58] Field of Search .................................. 342/185, 184; 348/441, 442; 364/731

[56] References Cited

U.S. PATENT DOCUMENTS

| | | | |
|---|---|---|---|
| 3,569,616 | 3/1971 | Baker | 178/6.8 |
| 3,633,173 | 1/1972 | Edge | 340/172.5 |
| 3,671,723 | 6/1972 | Belignieres et al. | 235/150.27 |
| 3,684,915 | 8/1972 | Gangawere | 315/23 |
| 3,727,217 | 4/1973 | Nirasawa | 343/5 |
| 3,737,120 | 6/1973 | Green | 244/3.17 |
| 3,765,018 | 10/1973 | Heard et al. | 343/5 |
| 3,774,202 | 11/1973 | Nolette | 343/5 |
| 3,797,014 | 3/1974 | Tompkins et al. | 343/5 |
| 3,798,425 | 3/1974 | Heard et al. | 235/150.27 |
| 3,810,174 | 5/1974 | Heard et al. | 343/5 |
| 3,838,420 | 9/1974 | Heard et al. | 343/5 |
| 3,904,817 | 9/1975 | Hoffman et al. | 178/6.8 |
| 4,002,827 | 1/1977 | Nevin et al. | 343/5 |
| 4,010,466 | 3/1977 | Hofstein | 343/5 |
| 4,065,770 | 12/1977 | Berry | 343/5 |
| 4,099,179 | 7/1978 | Hofstein | 343/5 |
| 4,106,021 | 8/1978 | Katagi | 343/5 |
| 4,128,838 | 12/1978 | Brands et al. | 343/55 |
| 4,220,969 | 9/1980 | Nitadori | 358/140 |
| 4,241,412 | 12/1980 | Swain | 364/731 |
| 4,275,415 | 6/1981 | Engle | 358/140 |
| 4,364,048 | 12/1982 | Waters et al. | 343/5 |
| 4,369,441 | 1/1983 | Wohlmuth | 340/733 |
| 4,383,258 | 5/1983 | Morin | 343/5 |
| 4,412,220 | 10/1983 | Aanstoot et al. | 343/55 |
| 4,434,422 | 2/1984 | Kenol et al. | 343/5 |
| 4,434,437 | 2/1984 | Strolle et al. | 358/140 |
| 4,485,402 | 11/1984 | Searby | 358/160 |
| 4,547,803 | 10/1985 | Richards | 358/140 |
| 4,568,941 | 2/1986 | Thomas et al. | 343/5 |
| 4,673,929 | 6/1987 | Nelson et al. | 340/703 |
| 4,688,046 | 8/1987 | Schwab | 342/456 |
| 4,697,185 | 9/1987 | Thomas et al. | 342/185 |
| 4,700,181 | 10/1987 | Maine et al. | 340/747 |
| 4,729,029 | 3/1988 | Henri et al. | 358/183 |
| 4,745,475 | 5/1988 | Bicknell | 358/140 |

(List continued on next page.)

FOREIGN PATENT DOCUMENTS

| | | |
|---|---|---|
| 0299666 | 6/1988 | European Pat. Off. . |
| 299666 | 1/1989 | European Pat. Off. . |
| PCT/US91/ 03900 | 6/1991 | WIPO . |
| WO91/20047 | 12/1991 | WIPO . |

*Primary Examiner*—Ian J. Lobo
*Attorney, Agent, or Firm*—Glenn W. Bowen

[57] ABSTRACT

A pseudo-code representation and a C language representation of a scan converter system whereby radar amplitude data specified in polar coordinates may be displayed on a computer monitor display controlled by rectangular coordinates is provided. The invention utilizes a look-up table that is built using a two-phase algorithm. The look-up table is set into an initial state after which a mapping process takes place in which all of the (x,y) coordinate values covering the display area are inversely projected to the nearest (r,θ) coordinate values using trigonometric and approximation procedures. Since more than one (x,y) value may map to the same (r,θ) value, these values are linked together to form a patch. All of the (r,θ) coordinates will not be hit in this mapping process. Therefore, a second phase of projection occurs. Each (r,θ) coordinate not hit in the aforementioned inverse projection is now projected forward to an (x,y) coordinate using trigonometric and approximation procedures. Upon conclusion of the formation of the look-up table, each (r,θ) value will have an associated patch of (x,y) values. The look-up table may now be addressed by r and θ. The associated patch contains the x and y coordinate values which are used to paint the display.

10 Claims, 1 Drawing Sheet

U.S. PATENT DOCUMENTS

| | | | |
|---|---|---|---|
| 4,754,279 | 6/1988 | Cribbs | 342/185 |
| 4,774,516 | 9/1988 | Henri et al. | 342/185 |
| 4,827,432 | 5/1989 | Kasano | 364/518 |
| 4,829,455 | 5/1989 | Long et al. | 364/521 |
| 4,833,475 | 5/1989 | Pease et al. | 342/185 |
| 4,845,501 | 7/1989 | Pease et al. | 342/185 |
| 4,857,899 | 8/1989 | Ishii | 340/701 |
| 4,862,154 | 8/1989 | Gonzalez-Lopez | 340/747 |
| 4,873,515 | 10/1989 | Dickson et al. | 340/728 |
| 4,876,651 | 10/1989 | Dawson et al. | 364/449 |
| 4,931,801 | 6/1990 | Hancock | 342/185 |
| 4,954,819 | 9/1990 | Watkins | 340/721 |
| 4,970,636 | 11/1990 | Snodgrass et al. | 364/518 |
| 5,027,112 | 6/1991 | Ross et al. | 340/792 |
| 5,093,798 | 3/1992 | Kita | 364/518 |
| 5,097,268 | 3/1992 | Bauer, Jr. et al. | 342/160 |
| 5,227,895 | 7/1993 | Carlebach | 358/456 |
| 5,313,611 | 5/1994 | Franklin et al. | 395/425 |
| 5,315,305 | 5/1994 | Noll | 342/185 |

PROGRAMMED RADAR COORDINATE SCAN CONVERSION

FIELD OF THE INVENTION

The invention relates generally to high-speed coordinate scan conversion of radar coordinates for video presentation and more particularly to software programmed video coordinate conversion.

BACKGROUND OF THE INVENTION

Conventional radar displays consist of circular-shaped cathode ray tubes (CRT) in which a rotating beam is made visible by electron bombardment of a phosphor coating on a CRT screen. Targets can be identified on the screen as the beam rotates in synchronism with a rotating antenna. This type of display is known as a Plan Position Indicator (PPI).

A PPI display has a number of objectionable characteristics. Because of the fact that it relies on the persistence of a phosphor, there is an inherent lack of brightness. Thus, the early tubes could be viewed satisfactorily only under very low levels of ambient lighting, and refreshing of the PPI display occurred only once per revolution of the radar antenna, and it, therefore, was dependent on the radar revolution rate.

In order to overcome these deficiencies and to achieve other advantages, scan converters have been developed to convert the PPI information, which is a function of the radius (r) and the angle (θ) of the radial beam from a reference location to TV or computer screen monitors in which the (x) and (y) coordinates of the screen are used to determine the image. Scan converter systems allow for the integration of radar displays and with computer video recording techniques, including multiple color displays, overlapping windows and the capability of adding text to the display.

Numerous types of such systems have been developed for providing the conversion of the (r,θ) information into the (x,y) information. The great majority of these relied on relatively complex hardware-dominated systems for providing the scan conversion. In the past such complex hardware systems were required to achieve the fast speed needed to process the real-time information being received from the radar return.

Software algorithms for radar coordinate digital scan conversion have been developed, as shown in U.S. Pat. No. 4,697,185 entitled "Algorithm for Radar Coordinate Conversion and Digital Scan Converters," issued Sep. 29, 1987 to David M. Thomas et al., and U.S. Pat. No. 4,931,801 entitled "Method and Apparatus to Scan Convert Radar Video to Television Outputs, " issued Jun. 5, 1990 to William R. Hancock. These algorithms were joined with specialized hardware to provide the desired (r,θ) to (x,y) scan conversion.

In the Thomas et al. patent it was noted that near the center or origin of a PPI display, the azimuthal resolution of the radar is greater than the resolution of the display, and, therefore, a number of (r,θ) points must be matched to the same (x,y) point. At long ranges in a PPI display, however, the radar resolution will often be less than that of the display. This results in a number of open areas in the display which have to be filled in. At intermediate ranges, the resolution of the radar and the display are approximately equal, and there may be a one-to-one mapping between the two coordinate systems.

In the Thomas et al. patent, look-up tables are utilized to hold sin and cos values to update the x and y values to the next consecutive coordinate of x and y values by adding a sin value to the x coordinate and a cos value to the y coordinate. In the Hancock patent look-up tables were also employed to control intensities of the display pixels. Look-up tables have also been employed in graphic displays to control colors of the image displayed.

SUMMARY OF THE INVENTION

Radar scan conversion from (r,θ) values employed in a PPI display are converted to (x,y) coordinates of a computer monitor by utilizing a digital computer which employs look-up tables, wherein the look-up tables are utilized in an algorithm which first computes an inverse mapping of the (x,y) coordinates of the monitor to the (r,θ) coordinates of the PPI display to fill the look-up table with values that link together the (x,y) points to the corresponding (r,θ) points. During this mapping some of the (r,θ) points will not have been "hit" or converted. To complete the mapping process a second phase "forward mapping" is then performed which links the remaining (r,θ) coordinates which have not been mapped during the inverse mapping phase to (x, y) coordinates. Each table entry represents an image patch. The number of pixels in a patch varies according to the radial distance of the patch from the origin of the display to compensate for the differences between the resolution of the radar and the resolution of the display. Since the look-up table has been established, the algorithm relates the predefined patches to the coordinate points of the display.

BRIEF DESCRIPTION OF THE DRAWING

The invention is described by reference to the drawings in which.

DESCRIPTION OF THE PREFERRED EMBODIMENT

Figure 1:
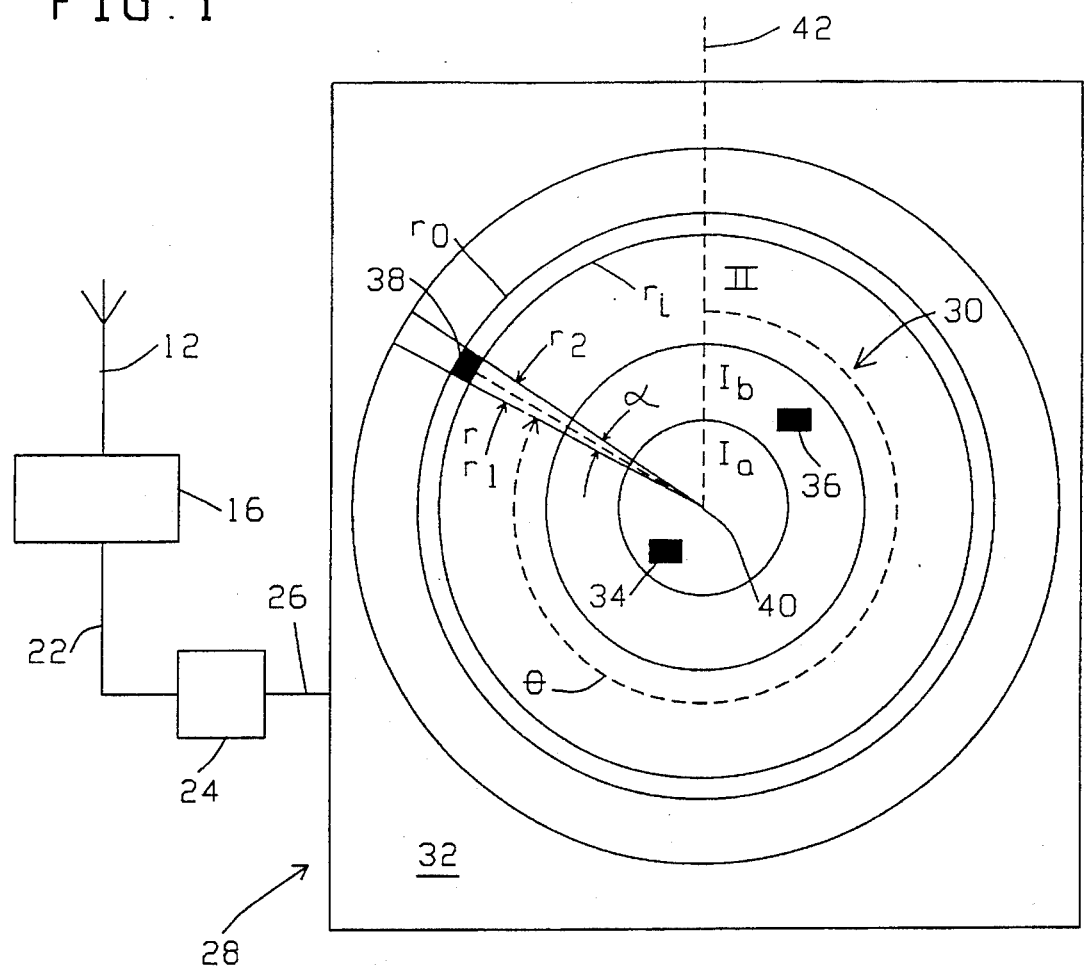
FIG. 1 is a block diagram of a system which provides a scan-converted display from a PPI radar display to a display controlled by (x,y) coordinate values, such as a TV-type display or computer screen, which illustrates a target display patch on the screen that is located in an area defined by two radial lines and a displacement angle.

The present invention is achieved by programming a digital computer which receives input data from a radar receiver display to provide a rotating display vector that is controlled by (x,y) coordinates rather than by (r,θ) coordinates that are employed in a PPI display. (In the following the theta and θ are used interchangeably to represent the coordinate angles.) The invention is preferably implemented without the modification of or the addition of any other hardware to a conventional computer or work station. It may be implemented with any type of programming, but preferably it will be implemented with high level programming language for ease of programming. However, assembly and machine-level programming could be employed to reduce memory requirements and to increase speed, if desired.

The look-up table is a composite data structure composed of two types of elements. The first type of element is a two-dimensional table of pointers indexed by r and θ. The compiler generates instructions for retrieving the value stored at a location indexed by r and when the expression P[theta][r] appears in the C language source code. This 32-bit value is an address or pointer.

The second type of element is a linked list. This is a data structure which is known in the field of computer science as a dynamic data structure. A dynamic data structure contains a variable amount of information and hence is of variable size. It is created and operated upon at run time, rather than at compile time. It is possible to increase or decrease its size using the standard C library functions malloc( ) and free( ) where malloc( ) means memory allocation.

A linked list is used because the patch sizes are not fixed. A patch corresponding to a small r value may hold only a single pixel, whereas a patch corresponding to a large r value may hold a large number of pixels. The Link() function creates an element of a linked list and inserts it at the front of the list. The two-dimensional table P holds the addresses of the first elements in the linked lists. That is, P[theta][r] points at the first element of a linked list that holds the rectangular coordinate(s) mapped from r and θ.

The system 10 of the present invention is described with reference to FIG. 1. A radar return signal is received by the rotating antenna 12 and is coupled to radar receiver 16. Prior radar PPI displays have a rotating radial scan beam that is formed on the display through the luminescence of the phosphor which is caused by electrons striking the phosphor on the sealed inside face of the back of the screen. By convention, the beam rotates in a clockwise manner. The receiver 16 supplies a digital data representation of the (r,θ) coordinates of the targets over a cable 22 to a programmable digital computer 24. The radar receiver is of the known type which furnishes at least two types of data directly to the scan converter computer 24 for every pulse echo that is received. The detected pulse data includes a sequential list of integers (usually 8-bit values) which correspond to the intensity of the echo over the specified range interval. The received echo is sampled at a given rate on a receiver. Each sample thus corresponds to the intensity of reflection of the transmitted radar pulse at a given range. Nominally, the pulse data will consist of up to several thousand integers per pulse echo.

The pulse data are downsampled or compressed so that ultimately only around 512–1024 values are sent to the scan converter. Another signal indicates the angular displacement of the radar antenna, or azimuth. Therefore, pulse and azimuth data are received by the scan converter repeatedly. The processed scan conversion output of the computer is coupled over the electrical cable 26 to be displayed to a monitor or TV display screen 28 which is controlled by (x,y) coordinate information rather than the (r,θ) coordinate information that is provided by a PPI. The display screen 28 may be integral with the computer 24 or may be associated with a separate monitor.

Since radar operators are used to the visual image that is generated by the circular display of a PPI and a clockwise rotating radial beam, this same type of image display 30 is preferably translated onto the screen 28. However, since the computer monitor screen 28 is usually square-shaped or rectangular-shaped, there are additional displayable areas 32 outside of the circular image area 30 of the screen which may correspond in shape to the circular PPI display. The areas of the screen outside of the image area 26 may be utilized to provide additional text information, database information or other desired information through windowing and other known graphic techniques. Alternately, the viewing area may extend to the edge of the display so that square, rather than round, area of radar data is shown to the operator.

Three different zones of the PPI display were recognized by the Thomas et al. patent which are labelled zones Ia, Ib and II in FIG. 1. In the center-most zone Ia more than one (r,θ) datapoint maps to what is termed the same "patch." A patch is a specified area, preferably square in shape which may be formed of a single pixel or of a combination of pixels, which is filled in whenever a (r,θ) datapoint specifies the patch area. In the Ia zone the azimuthal resolution of the radar is greater than the display resolution, and therefore, a single pixel may represent a number of (r,θ) datapoints, as shown by the patch 34.

In zone Ib there is a one-to-one mapping between (r,θ) datapoints and (x,y) coordinate points. In this zone the radar resolution and the display resolution are approximately equal, as shown by patch 36 which represents a mapped target patch for zone 1b.

For the longer range targets that appear in zone II, the display resolution is greater than the radar resolution. As previously mentioned, zone II may extend to the edge of the display 32. To provide a satisfactory image, each (r,θ) datapoint value must match to a patch, such as the patch 38 that is formed of a number of square-shaped pixels. This is bound by an inner integer radius value r and an integer outer radius value $r_0$ between the radial lines $r_1$, $r_2$. The angle α between $r_1$ and $r_2$ is bisected by the radial line r that represents the rotating beam that corresponds to a beam on the PPI display.

Figure 2:
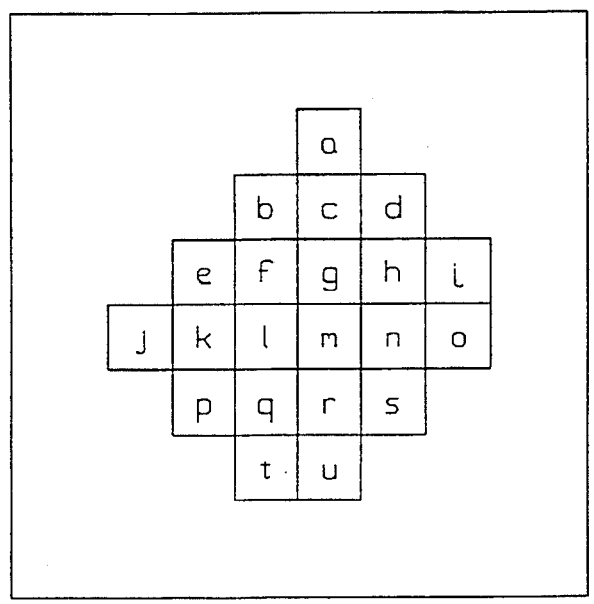
FIG. 2 represents an enlarged view of the target display patch of FIG. 1 which shows a display patch that is made up of several pixels.

The patch 38 is made up of a number of filled-in square-shaped pixels. It is shown as a rectangle in FIG. 1, as are patches 34 and 36. These patches may be formed, however, as a group of filled in square pixels, such as the pixels a–u of FIG. 2. The (r,θ) coordinates of every element of every pulse are thereby scan converted onto the display as pixels. These pixels form a predefined shape with a good visual image according to the radial distance of the patch from the origin 40 of the image area and the angle of revolution of the beam from an arbitrary zero degree angle.

The implementation of the present invention relies upon the mapping from polar to rectangular coordinates through the use of a look-up table (LUT). The LUT is implemented as two-dimensional table, which is indexed by the (r,θ) datapoints such that each table entry identifies a particular patch. During operation the LUT can be accessed very quickly through the use of conventional computer hardware to re-compute each relationship between the (r,θ) coordinates of the PPI and the patch (x,y) coordinates of the computer monitor screen.

The LUT is desirably created only upon initialization or when a radar mode change occurs. Since generally a radar mode will be changed only infrequently during operation, the overall throughput of the system will thereby increase by the single initialization. However, if the systems does require frequent mode changes, multiple look-up tables can be pre-computed and stored and associated with each of the mode changes. The use of the LUT enables high speed processing with overhead consisting of only additional memory space, which under current technology conditions is a wise trade-off for high performance applications since memory is relatively inexpensive compared to increasing the speed of hardware.

In the invention the values for the LUT are computed using a two-step conversion process. The first phase of the algorithm is the computation of an "inverse mapping" from the (x,y) coordinates of the monitor to the (r,θ) coordinates of an equivalent PPI display. A patch is then formed by linking together the (x,y) points which match to the same (r,θ) points. During this mapping some of the (r,θ) points will not be "hit" or converted. To complete the mapping process, a second phase or a "forward mapping" is then preformed which links the (r,θ) coordinates, which have not been mapped during the inverse mapping phase, to (X,Y) coordinates.

In the typical installation, the azimuthal (r,θ) resolution is small compared to the resolution of the display, and the patches are composed of many pixels. The radius of the rotating beam on the computer monitor screen is divided up into a number of integral units, and the angle is divided into integral units. For example, 512 interval radius units and from 360–8192 integral radial units per scan are readily implemented. The values of the (x,y) coordinates may also be divided into integral units, for example 1024, in the described embodiment. A maximum patch size that will be obtained in the outer regions II typically will be on the order of 13 pixels while the average patch size will be approximately 4.5 pixels for low and medium resolution radars. An implementation to provide such patches using linked lists is described later herein.

It is possible to operate with radars having a very high pulse repetition frequency compared to the scan rates. In such a case the azimuthal resolution may be on the order of 8192 integral units of angle. In this case the maximum patch size may be one pixel and a one-to-one mapping may be obtained across the entire screen. The algorithm of the invention operates to handle both the lower pulse repetition frequency radars and the higher pulse repetition radars without modification.

A high level pseudo-code description of the manner in which the scan converter LUT is constructed is provided in the following table. For this pseudo-code representation, the patches are expressed as a set of points. A patch of P points is defined by:

$$P(r,\theta) = \{(x_1,y_1),(x_2,y_2), \ldots (x_p,y_p)\}$$

Functions that are included in the standard C programming language library are also included in the following pseudo-code representation of the algorithm. Other types of programming languages and programming techniques to implement these, or equivalent, functions will be readily obvious to the those of ordinary skill in the programming and computer arts.

Since there are 1024 integral units of x and y coordinates from zero to 1023, the maximum x and y values will be 1023. The center of the display, or the origin, is defined as $x_c, y_c$ where the first coordinate corresponds to the horizontal axis and the second coordinate corresponds to the vertical axis on the monitor display. The upper left-most corner of this display will have a coordinate 0,0 and the lower right-most corner display will be at X–1, X–1. The angle θ=0° when the radial beam line points upward vertically along the line 22 is shown in FIG. 1. Each succeeding integral angle of the 360 integral angle units is defined by clockwise rotation of the beam around the display.

A pseudo code representation of the manner in which the (x,y) coordinates are first mapped into (r,θ) coordinates through the inverse mapping process is shown in Table I. Those datapoints which have not been accounted for by the inverse mapping process are next acquired by a forward mapping of (r,θ) coordinates into (x,y) datapoints.

In order to achieve this mapping, the look-up table must first be initialized, as noted by the comment line 1 of Table I.

Line 2 of the pseudo-code states that the initialization is to occur for all points over the entire range of integral r and θ values. Line 3 provides that all of the (r,θ) values in the LUT are first initialized to a logic zero state.

Line 4 is a comment that indicates that the inverse mapping phase can occur after the table has been initialized.

Since the range of x and y values will be the same, line 5 states that inverse mapping is to incur for all x and y of variables from a zero value up to the maximum value.

Line 6 is a "conditional if" statement that says that as long as the x and y values do not define the origin 40, or center-point, of the radial beam, then the inverse mapping process can begin and can continue.

Line 7 is the mathematical formulation for computing the r radius data value for each x and y coordinate value. This may be computed by the conventional mathematical function for finding the hypotenuse of a triangle in which the x and y values are each squared, added together and the square root of the sum of the squares is taken. Since the x and y values are referenced to the origin of the beam, the values used in the equation are $x-x_c, y-y_c$.

The "irint" function used in lines 7 and 8 means that these computations are made in floating point arithmetic, and the result is rounded off to the nearest integer according to whether the residue is less than or greater than 0.5.

Line 8 of the pseudo-code is the equation for finding the θ value. As seen by reference the FIG. 1, the defined θ angle is the angle from an initial reference line, such as the horizontal 270° reference line 44, to the radius r of the beam which is located midway between the two radial lines, r1 and r2 which define the outer edges of patch 38. The zero degree reference line 42 points straight up in the page, as shown in FIG. 1. The reference line 44 at 270 degrees clockwise from the vertical line 42 is directed to the left side of FIG. 1. The negative sign before the quantity $(x-x_c)$ is required because the rotation of the PPI screen is in the clockwise direction while the rotating radius vector in Cartesion coordinate systems has a counter-clockwise rotation.

Lines 9 and 10 specify that when all of the (r,θ) coordinate points within the allowed range of the (r,θ) values that corresponded to (x,y) target coordinates up to the maximum X value have been mapped into the LUT, the inverse mapping procedure ends, as indicated on line 11.

Processing next proceeds to the forward mapping phase as indicated on comment line 12. This phase takes care of all of those target datapoints which did not fall on any specific (x,y) coordinate, and, therefore, were not mappped by the inverse mapping phase. Line 13 states that for all of these (r,θ) points within the range of the (x,y) data, the conditions of line 14 applies so that if the initial point is at the origin 40, then the forward mapping process will begin and will continue.

Line 15 again defines the calculation of the x values with reference to the center, or origin value, of x. A floating point round off process (irint) is again employed where the x value is merely derived from the radius and the sine of the angle θ.

Line 16 defines the calculation of the y value using the cosine function and the irint rounding off operation to provide integral x and y values.

Line 17 states that if x is less than zero, or negative, then the process requires that x be set in line 18 to zero.

Line 19 defines that otherwise if x is equal to or greater than the maximum value X.

Then the process continues, as noted in line 20 until x reaches the maximum coordinate value of (x−1).

Line 21 specifies that if x is less than zero, or negative, then y is set to zero, as shown in line Line 23 states that otherwise when x is equal to or greater than the maximum value X, as shown on line 24, the process continues until all of the remaining x and y values have been mapped from corresponding (r,θ) integer datapoints and have been stored in the LUT.

The forward mapping process ends, as represented in lines 25 and 26 of the pseudo-code.

The LUT now will be usable for directly mapping the incoming data values from the PPI display to the computer monitor screen. Each of the stored data values in the LUT represents a particular pixel or a patch made of a multiple of pixels. The manner in which the pixels are utilized to provide desired multi-pixel patches depends on the relative resolution of the radar and the display screen. This linking and mapping uses an additional algorithm which is not dependent upon the manner in which the LUT mapping was achieved. Thus, the radar system may change from mode-to-mode, or the same implemented mapping algorithm may be utilized for an alternate system by connecting the computer and the computer screen to a different radar. For example, mode change may be necessary if angular resolution changes. Another time that the LUT needs to be calculated is when the display mode of the radar system changes into or from a PPI mode. The memory used by the LUT may be needed for another mode and hence may be lost. A second LUT may also be pre-initialized and switched in to accommodate mode changes.

Because of ease of programming, the scan converter of the present invention is desirably implemented in a high level programming language. A C language representation is shown in Table II. The source code listing of the scan converter look-up table construction algorithm using linked lists that is written in C is closely related to the previously described pseudo-code representation of Table I. As previously noted, the standard mathematical library functions employed in C provide a very compact and efficient implementation of the invented algorithm.

Line 1 indicates that the math header file is to be included in the algorithm.

Lines 2 through 5 provide definitions which indicate that the x,r and θ values are integral values which are to be utilized in string replacement sequential process.

x ranges from 0 to X−1=1023.

theta ranges from 0 to THETA−1−359.

The value NULLP is used as an initial value; it indicates the empty or "NULL" patch.

Lines 6 through 9 declare the patch linked list structure. A structure in the linked list holds the rectangular coordinate (x,y) and a pointer to the next structure in the list.

The word "short" in line 7 means that a small word will be employed for implementation of 16 bits.

Line 10 defines a two-dimensional table (the aforementioned LUT) which is indexed by theta and r and which holds the pointers to the patches.

Before mapping can proceed further, the look-up table must be initialized. This is indicated by a comment line 11 which indicates a scan converter LUT is to be constructed. The function which builds the look-up table is known as BuildSCLUT().

The process of building a scan converter is started on lines 12 and 13. Lines 14 through 19 reserve registers for x,y, x, r and θ. Registers are desirably employed because of the real time requirements of the scan conversion scheme.

A register variable definition is an indication to the compiler that the variable should be stored in a register for efficiency in accessing it.

Lines 20 and 21 show that x and y can be derived from the maximum value of x where $x_c=y_c=512$.

In order for the mapping process to begin, the look-up table must be initialized, as indicated by the comment line 22.

The lines 23, 24 and 25 indicate that a double-loop process is employed for initialization in which theta begins at the angle 0 and continues to be incremented by unit degrees as long as theta is still less than the maximum theta value of 360°. In a similar manner, r begins at a value of 0 and is incremented by units as long as it is less than the maximum value of 512.

Line 25 indicates that the entries of the look-up table are initialized as empty patches. The term "double" indicates that the following variable is to be promoted to a double precision floating point representation.

The inverse mapping begins as indicated by comment line 26.

Lines 27 and 28 are another double-loop in which x begins at 0 value and is incremented as long as it is less than the maximum value of X=1024. Similarly, y begins at 0 value and is incremented as long as it is less the the value of X=1024.

Line 29 indicates that as long as the x and y values are not at the origin, the calculation of the radius r represented in lines 30 and 31 functions in the same manner as the calculation of line 7 of the pseudo-code.

In a similar manner, the value of theta is calculated as indicated in lines 32, 33 and 34 in the manner indicated in the pseudo-code in line 8.

The line 35 indicates that the remainder for theta should be kept so that the angle of operation will always be less than 360° which corresponds to a full revolution of the beam around its circular path.

The linking function for the inverse mapping is then defined in lines 36 through 38 which states that if r is equal to or greater than one and is less that the maximum value r, and theta is equal to or greater than 0 and theta is less than the maximum value of theta. Thus, a structure containing x and y is inserted into the linked list corresponding to r and theta.

The comment on line 40 indicates that the forward mapping can begin to pick up the remaining r and theta points which have not been linked through the inverse mapping process.

The double-loop process of lines 41 and 42 indicate that theta begins at a 0°, and continues to be incremented as long as it is less than the maximum theta, and radius r begins at a value of 1 and is incremented as long as it is less than the maximum r value.

Line 43 states that if the theta and r values are indicative of the NULLP then the calculation of the x and y values proceeds.

Lines 44 through 46 represent the calculation of the value x which corresponds to the line 15 of the pseudo-code.

Similarly, lines 47, 48 and 49 indicate the calculation which corresponds to the line 16 of the pseudo-code.

Line 50 indicates that if x is less than 0, (i.e., it has a negative value), then in line 51 it will be set equal to 0.

Otherwise, as line 52 indicates, if x is equal to or greater than the maximum value x, it will be set to a value of x−1.

Lines 54 through 57 indicate that the same results will occur for the value y.

Line 58 is the linking function which inserts a structure containing x and y into the linked list corresponding to r and theta. The LUT has now been computed so that the rectangular coordinates mapped from a given polar coordinate may be readily accessed by traversing the appropriate linked list.

Line 59 indicates the closing of the forward mapping process.

Line 60 indicates the closing of the entire mapping process.

patches are linked to specific x and y values is set forth in the linking algorithm, as represented by lines 61 through 89 or the algorithm.

The following Tables I and II represent a pseudo-code listing and C code listing, respectively, to implement the present invention. Other software implementation and language may be employed within the scope of the appended claims and as taught by the described invention.

TABLE I

PSEUDO-CODE LISTING

```
// Initialize LUT
∀(r,θ) ∈ R × Θ
        P(r,θ) = 0;
Inverse mapping
∀(x,y) ∈ X × X
        if ((x,y) ≠ (x_c,y_c)) then begin
                r = irint(hypot(x − x_c, y − y_c));
                74 = irint((π + atan2(−(x − x_c), (y − y_c)))Θ/(2π)) mod Θ;
                if ((r,θ) ∈ R × Θ) then
                        P(r,Θ) = P(r,θ) ∪ {(x,y)};
        end
// Forward mapping
∀(r,θ) ∈ R × Θ
        if (P(r,θ) == 0) then begin
                x = x_c + irint(r sin(2πθ/Θ));
                y = y_c − irint(r cos(2πθ/Θ));
                if (x < 0) then
                        x = 0;
                else if (x ≥ X) then
                        x = X − 1;
                if (y < 0) then
                        y = 0;
                else if (y ≥ X) then
                        y = X − 1;
                P(r,θ) = {(x,y)};
        end
```

Line 61 indicates the start of the process of inserting a patch at the front end of a linked 4r.

The Link( ) function, beginning on line 62, inserts a structure containing the given arguments x and y into a linked list pointed at by the argument patchpp. Lines 62–65 specify the arguments to the function which are, respectively, patchpp: a pointer to the head of a linked list of patches, x and y: the given rectangular coordinates to be added to the linked list.

The arguments are defined as register variables to indicate to the compiler that they should preferably be placed in CPU registers for efficiency's sake. Line 66 indicates the start of the function.

Lines 69–72 indicate the allocation of memory from the system heap for the patch structure. The use of the standard C library function malloc() for this purpose will be readily apparent to one familiar with the language.

Lines 73 and 74 assign the values of x and y into the structure.

Lines 75–76 insert the structure at the head of the linked list pointed at by patachpp. Line 75 assigns the value of patchpp into the next pointer in the structure. Line 76 assigns the address of the newly created structure to the memory location pointed at by the argument patchpp.

Line 77 indicates the close of the function.

Since the LUT was mapped so that all of the r values of point correspond with y coordinates of the monitor display, the LUT may be utilized to match patches from the various portions of this screen to provide the desirable image. In accordance with the resolution, the manner in which the

TABLE II

C Source Code Listing

```
/* Scan converter LUT algorithm using linked lists
 */
#include             <math.h>
#define      X       1024
#define      R       512
#define      THETA   360
#define      NULLP   ((struct patch *) (0))
struct patch {
    short            x,
                     y;
    struct patch     *next;
};
struct patch         *P[THETA][R];
/* Build scan converter LUT
 */
BuildSCLUT( )
{
    register int  x,
                  y,
                  x_c,
                  y_c,
                  r,
                  theta;
    x_c = X / 2;
    y_c = X / 2;
    /* Initialize LUT
     */
    for (theta = 0; theta < THETA; theta++)
    for (r = 0; r < R; r++)
        P[theta][r] = NULLP;
    /* Inverse mapping
     */
```

TABLE II-continued

Source Code Listing

```
        for (x = 0; x < X; x++)
            for (y = 0; y < X; y++)
                if (x != x_c || y != y_c) {
                    r = irint(hypot((double) (x - x_c),
                        (double) (y - y_c)));
                    theta = irint((M_PI + atan2((double)
                        - (x - x_c), (double) (y - y_c))) *
                        (double) THETA / (2.0 * M_PI))
                        % THETA;
                    if (r >= 1 && r < R &&
                        theta >= 0 && theta < THETA)
                        Link(&(P[theta][r]), x, y);
                }
/* Forward mapping
 */
    for (theta = 0; theta < THETA; theta++)
        for (r = 1; r < R; r++)
            if (P[theta][r] == NULLP) {
                x = x_c + irint((double) r *
                    sin(2.0 * M_PI *
                    (double) theta / (double) THETA));
                y = y_c - irint((double) r *
                    cos(2.0 * M_PI *
                    (double) theta (double) THETA));
                if (x < 0)
                    x = 0;
                else if (x >= X)
                    x = X - 1;
                if (y < 0)
                    y = 0;
                else if (y >= X)
                    y = X - 1;
                Link(&(P[theta][r], x, y);
            }
}
/* Insert patch at front of linked list
 */
Link(patchpp, x, y)
register struct patch   **patchpp;
register int            x,
                        y;
{
    register struct patch *patchp;
    if ((patchp = (struct patch *)
        malloc(sizeof(struct patch))) == NULLP) {
            puts("malloc( ) failed");
            return;
    }
    patchp->x = x;
    patchp->y = y;
    patchp->next = *patchpp;
    *patchpp = patchp;
}
```

[1] © 1993 Unisys Corporation. All rights reserved.

We claim:

1. A process for implementing a look-up table means in a digital computer in order to provide radar scan conversion for radar data based upon polar coordinates to radar data based upon rectangular coordinates wherein said look-up table means is addressed by signals that represent range and angle $(r,\theta)$ values from a radar receiver and supplies signals to a monitor display that represent $(x,y)$ coordinate values that define pixel locations of said monitor display, comprising the steps of:

(a) providing an inverse mapping of integral $(x,y)$ coordinate values to integral $(r,\theta)$ coordinate values of an equivalent radar PPI display area in said look-up table means by calculating in said digital computer each $(r,\theta)$ coordinate value from said integral $(x,y)$ coordinate values and by rounding-off each fractionally calculated $(r,\theta)$ coordinate value to the nearest $(r,\theta)$ integral coordinate value, and (b) providing a forward mapping of integral $(r,\theta)$ coordinate values of said equivalent radar PPI display which were not mapped by said inverse mapping to integral $(x,y)$ coordinate values in said look-up table means by calculating in said digital computer each $(x,y)$ coordinate value from said equivalent integral $(r,\theta)$ coordinate values that were not mapped by said inverse mapping, and by rounding-off each fractionally calculated $(x,y)$ coordinate value to the nearest integral $(x,y)$ coordinate value.

2. A process for implementing a look-up table means in a digital computer in order to provide radar scan conversion for radar data based upon polar coordinates to radar data based upon rectangular coordinates wherein said look-up table means is addressed by signals that represent range and angle $(r,\theta)$ coordinate values from a radar receiver and supplies $(x,y)$ coordinate values to a monitor display that define pixel locations of said monitor display, comprising the steps of, directing said digital computer to provide an inverse mapping of integral $(x,y)$ coordinate values to integral $(r,\theta)$ coordinate values of an equivalent radar PPI display in said look-up table means wherein said digital computer is directed by software to provide an inverse mapping as prescribed by the following pseudo-code:

```
//Initialize LUT
∀(r,θ) ∈ R × Θ
    P(r,θ) = ∅;

//Inverse mapping
∀(x,y) ∈ X × X
    if ((x,y) ≠ (x_c,y_c)) then begin
        r = irint(hypot(x - x_c, y - y_c));
        θ = irint((π + atan2(- (x - x_c),(y - y_c)))Θ/(2π))modΘ;
        if ((r,θ) ∈ R × Θ) then
            P(r,θ) = P(r,θ) ∪ {(x,y)};
    end
``` and, directing said digital computer to provide a forward mapping of additional integral $(r,\theta)$ coordinate values of said equivalent radar PPI display to additional integral $(x,y)$ coordinate values in said look-up table means wherein said digital computer is directed by software to provide a forward mapping, as prescribed by the following pseudo-code:

```
//Forward mapping
∀(r,θ) ∈ R × Θ
    if P(r,θ) = = ∅ then begin
        x = x_c + irint(r sin(2πθ/Θ));
        y = y_c - irint(r cos(2πθ/Θ));
        if (x < 0) then
            x = 0;
        else if (x ≧ X) then
            x = X - 1;
        if (y < 0) then
            y = 0;
        else if (y ≧ X) then
            y = X - 1;
        P(r,θ) = {(x,y)};
    end
```

3. In a digital computer system which comprises a monitor display and a digital computer which comprises a look-up table means that is used to provide radar scan conversion for radar data based upon polar coordinates to radar data based upon rectangular coordinates, wherein said look-up table means is addressed by signals that represent range and angle $(r,\theta)$ values and supplies signals to said monitor display that represent $(x,y)$ coordinate values that define pixel locations of said monitor display, the new use of said digital computer:

(a) to provide an inverse mapping of integral $(x,y)$ coordinate values to integral $(r,\theta)$ coordinate values of an equivalent radar PPI display in said look-up table means by calculating in said digital computer each $(r,\theta)$ coordinate value from said integral $(x,y)$ coordinate values, and by rounding-off each fractionally calculated $(r,\theta)$ coordinate value to the nearest $(r,\theta)$ integral coordinate value, and (b) to provide a forward mapping of integral $(r,\theta)$ coordinate values of said equivalent radar PPI display which were not mapped by said inverse mapping to integral $(x,y)$ coordinate values in said look-up table means by calculating each $(x,y)$ coordinate value from said integral $(r,\theta)$ coordinate values that were not mapped by said inverse mapping, and by rounding-off each fractionally calculated $(x,y)$ coordinate value to the nearest integral $(x,y)$ coordinate value.

4. In a digital computer system which comprises a monitor display and a digital computer which comprises a look-up table means that is used to provide radar scan conversion for radar data based upon polar coordinates to radar data based upon rectangular coordinates, wherein said look-up table means is addressed by signals that represent range and angle $(r,\theta)$ values and supplies signals to said monitor display that represent $(x,y)$ coordinate values that define pixel locations of said monitor display, the new use of said digital computer, (a) to provide an inverse mapping of integral $(x,y)$ coordinate values to integral $(r,\theta)$ coordinate values of an equivalent radar PPI display in said look-up table means wherein said inverse mapping is implemented by software that is coded as prescribed by the following pseudo-code:

```
//Initialize LUT
∀(r,θ) ∈ R × Θ
    P(r,θ) = ∅;

//Inverse mapping
∀(x,y) ∈ X × X
    if ((x,y) ≠ (xc,yc)) then begin
        r = irint(hypot(x − xc,y − yc));
        θ = irint((π + atan2(− (x − xc),(y − yc)))Θ/(2π))modΘ;
        if ((r,θ) ∈ R × Θ) then
            P(r,θ) = P(r,θ) ∪ {(x,y)};
    end
``` and, to provide a forward mapping of additional integral $(r,\theta)$ coordinate values of said equivalent radar PPI display to additional integral $(x,y)$ coordinate values in said look-up table means wherein said forward mapping is implemented by software that is coded as prescribed by the following pseudo-code:

```
//Forward mapping
∀(r,θ) ∈ R × Θ
    if P(r,θ) = = ∅ then begin
        x = xc + irint(r sin(2πθ/Θ));
        y = yc − irint(r cos(2πθ/Θ));
        if (x < 0) then
            x = 0;
        else if (x ≥ X) then
            x = X − 1;
        if (y < 0) then
            y = 0;
        else if (y ≥ X) then
            y = X − 1;
        P(r,θ) = {(x,y)};
    end
```

5. A radar scan conversion system for radar signal scan conversion of radar data based upon polar coordinates to radar data based upon rectangular coordinates comprising:

a digital computer which comprises look-up table means which receives range and angle $(r,\theta)$ signals as addressing signals, and a monitor display coupled to receive $(x,y)$ coordinate data signals from said look-up table means, which define pixel locations of said monitor display, wherein said look-up table means has been implemented by:

a first software process which directs said digital computer to provide an inverse mapping of integral $(x,y)$ coordinate values to integral $(r,\theta)$ coordinate values of an equivalent radar PPI display in said look-up table means by calculation of each $(r,\theta)$ coordinate value from said integral $(x,y)$ coordinate values and by the rounding-off of each fractionally calculated $(r,\theta)$ integral value to the nearest $(r,\theta)$ integral coordinate value, and a second software process which directs said digital computer to provide a forward mapping of the integral $(r,\theta)$ coordinate values of said equivalent radar PPI display that were not mapped by inverse mapping in to integral $(x,y)$ coordinate values said look-up table means by calculation of each $(x,y)$ coordinate value from said equivalent integral $(r,\theta)$ coordinate values, and by the rounding-off of each fractionally calculated $(x,y)$ coordinate value to the nearest integral $(x,y)$ value.

6. A radar scan conversion system for radar signal scan conversion of radar data based upon polar coordinates to radar data based upon rectangular coordinates comprising:

a digital computer programmable by software program means which comprises look-up table means and which receives range and angle $(r,\theta)$ signals as addressing signals, and a monitor display coupled to receive $(x,y)$ coordinate data signals from said look-up table means, which define pixel locations of said monitor display, wherein said look-up table means has been implemented by a software program which directs said digital computer to provide, (a) an inverse mapping of integral $(x,y)$ coordinate values to integral $(r,\theta)$ coordinate values of an equivalent radar PPI display in said look-up table means wherein said software program is coded as prescribed by the following pseudo-code:

```
//Initialize LUT
∀(r,θ) ∈ R × Θ
    P(r,θ) = ∅;

//Inverse mapping
∀(x,y) ∈ X × X
    if ((x,y) ≠ (xc,yc)) then begin
        r = irint(hypot(x − xc,y − yc));
        θ = irint((π + atan2(− (x − xc),(y − yc)))Θ/(2π))modΘ;
        if ((r,θ) ∈ R × Θ) then
            P(r,θ) = P(r,θ) ∪ {(x,y)};
    end
``` and, (b) to provide a forward mapping of additional integral $(r,\theta)$ coordinate values of said equivalent radar PPI display to integral $(x,y)$ coordinate values to said look-up table means wherein said software program is further coded as prescribed by the following pseudo-code:

```
//Forward mapping
∀(r,θ) ∈ R × Θ
    if P(r,θ) = = ∅ then begin
        x = xc + irint(r sin(2πθ/Θ));
        y = yc − irint(r cos(2πθ/Θ));
```

```
-continued
        if (x < 0) then
            x = 0;
        else if (x ≥ X) then
            x = X - 1;
        if (y < 0) then
            y = 0;
        else if (y ≥ X) then
            y = X - 1;
        P(r,θ) = {(x,y)};
end
```

7. In a digital computer system which comprises a display monitor, a software program and a digital computer which comprises look-up table means, which is used to convert radar data based upon polar coordinates to radar data based upon rectangular coordinates, wherein said look-up table means is addressed by signals that represent range and angle $(r,\theta)$ values from a radar receiver and supplies signals to said monitor display that represent $(x,y)$ coordinate values that define pixel locations of said monitor display, the improvement wherein said look-up table means is implemented by said software program which comprises, (a) a first software process which directs said digital computer to provide an inverse mapping in said look-up table means of integral $(x,y)$ coordinate values to integral $(r,\theta)$ coordinate values of an equivalent radar PPI display by calculating each $(r,\theta)$ coordinate value from said integral $(x,y)$ coordinate values and by rounding-off each fractionally calculated $(r,\theta)$ integral value to the nearest $(r,\theta)$ integral coordinate value, and (b) a second software process which directs said digital computer to provide a forward mapping in said look-up table means of integral $(r,\theta)$ coordinate values of said equivalent radar PPI display that were not mapped by inverse mapping integral $(x,y)$ coordinate values by calculating each $(x,y)$ coordinate value from said equivalent integral $(r,\theta)$ coordinate values, and by rounding-off each fractionally calculated $(x,y)$ coordinate value to the nearest integral $(x,y)$ value.

8. In a digital computer system which comprises look-up table means, a digital computer which comprises a display monitor a software program which is used to convert radar data based upon polar coordinates to radar data based upon rectangular coordinates, wherein said look-up means is addressed by signals that represent range and angle $(r,\theta)$ values from a radar receiver and supplies signals to said monitor display that represent $(x,y)$ coordinate values that define pixel locations of said monitor display, the improvement wherein said look-up table means is implemented by said software program which comprises, a first software process which directs said digital computer to provide an inverse mapping of integral $(x,y)$ coordinate values to integral $(r,\theta)$ coordinate values of an equivalent radar PPI display in said look-up table means wherein said first software process means is coded as prescribed by the following pseudo-code:

```
//Initialize LUT
∀(r,θ) ∈ R × Θ
    P(r,θ) = ∅;

//Inverse mapping
∀(x,y) ∈ X × X
    if ((x,y) ≠ (x_c,y_c)) then begin
        r = irint(hypot(x - x_c, y - y_c));
        θ = irint((π + atan2(- (x - x_c),(y - y_c)))Θ/(2π))modΘ;
        if ((r,θ) ∈ R × Θ) then
            P(r,θ) = P(r,θ) ∪ {(x,y)};
    end
``` and, a second software process which directs said digital computer to provide a forward mapping of additional integral $(r,\theta)$ coordinate values of said equivalent radar PPI display to additional integral $(x,y)$ coordinate values to said look-up table means wherein said second software process means is coded as prescribed by the following pseudo-code:

```
//Forward mapping
∀(r,θ) ∈ R × Θ
    if P(r,θ) == ∅ then begin
        x = x_c + irint(r sin(2πθ/Θ));
        y = y_c - irint(r cos(2πθ/Θ));
        if (x < 0) then
            x = 0;
        else if (x ≥ X) then
            x = X - 1;
        if (y < 0) then
            y = 0;
        else if (y ≥ X) then
            y = X - 1;
        P(r,θ) = {(x,y)};
    end
```

9. A radar scan conversion system for converting from radar amplitude data in polar coordinates to rectangular coordinates comprising, a programmable digital computer, a radar receiver for receiving radar signals and for supplying $(r,\theta)$ coordinate data to said digital computer, a monitor display controlled by $(x,y)$ coordinate data coupled to said digital computer, wherein said digital computer is programmed to implement a look-up table so that the $(r,\theta)$ coordinate data are utilized to address said look-up table and said look-up table provides $(x,y)$ coordinate data that are supplied by said digital computer to said monitor display, and a storage medium containing a software program constructed to implement said look-up table comprising (a) first computer readable program means for providing an inverse mapping of predefined integral $(x,y)$ coordinate points to $(r,\theta)$ coordinate points utilizing trigonometric formulations to calculate said $(r,\theta)$ coordinate points from said $(x,y)$ coordinate points and rounding-off fractional calculated numbers to the closest r and θ values, and (b) second computer readable program means for providing a forward mapping of integral $(r,\theta)$ coordinate values which were not mapped by the inverse mapping process comprising utilizing trigonometric formulations to calculate said x and y coordinate values from said r and θ integral values and rounding-off calculated values to the nearest integral x and y values until all of said remaining $(r,\theta)$ integral values have been mapped.

10. A storage medium for loading data into a look-up table in a digital computer wherein said digital computer is utilized in a radar scan conversion system for converting from radar amplitude data in polar coordinates to rectangular coordinates which also comprises, a radar receiver for receiving data $(r,\theta)$ coordinate data and for supplying said $(r,\theta)$ coordinate data to said digital computer, and a monitor display coupled to receive $(x,y)$ coordinate data from said digital computer, wherein said digital computer employs said look-up table by using the $(r,\theta)$ coordinate data to address said look-up table to obtain $(x,y)$ coordinate data from said look-up table which are supplied by said digital computer to said monitor display, comprising;

a stored software program which is constructed to load data into said look-up table comprising (a) a first computer readable program means for providing an inverse mapping of predefined integral (x,y) coordinate points to (r,θ) coordinate points utilizing trigonometric formulations to calculate said (r,θ) coordinate points from said (x,y) coordinate points and rounding-off fractionally calculated numbers to the nearest r and θ integral values, and (b) a second computer readable program means for providing a forward mapping of integral (r,θ) coordinate values which were not mapped by the inverse mapping process comprising utilizing trigonometric formulations to calculate said x and y coordinate values from said r and θ integral values and rounding-off calculated values to the nearest integral x and y values until all of said remaining (r,θ) integral values have been mapped.

* * * * *

UNITED STATES PATENT AND TRADEMARK OFFICE
CERTIFICATE OF CORRECTION

PATENT NO. : 5,519,401
DATED : May 21, 1996
INVENTOR(S) : Michael E. Farmer, Stephen M. Sohn It is certified that error appears in the above-indentified patent and that said Letters Patent is hereby corrected as shown below:

Column 7 line 4, at the end insert -- 22. --

Column 10 Table I 4th line, delete "74" and substitute -- θ --

Column 15 line 39, after "monitor" insert -- and --

Signed and Sealed this

Seventeenth Day of September, 1996

*Attest:*

BRUCE LEHMAN

*Attesting Officer*   *Commissioner of Patents and Trademarks*